(12) United States Patent
Shikata et al.

(10) Patent No.: US 11,063,314 B2
(45) Date of Patent: Jul. 13, 2021

(54) MANUFACTURING METHOD OF BATTERY AND BATTERY MANUFACTURING SYSTEM

(71) Applicant: TOYOTA JIDOSHA KABUSHIKI KAISHA, Toyota (JP)

(72) Inventors: Katsuya Shikata, Nisshin (JP); Masaki Koike, Nagoya (JP); Akira Tsukui, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 219 days.

(21) Appl. No.: 16/373,011

(22) Filed: Apr. 2, 2019

(65) Prior Publication Data

US 2019/0319226 A1    Oct. 17, 2019

(30) Foreign Application Priority Data

Apr. 16, 2018    (JP) .............................. JP2018-078635

(51) Int. Cl.
| | |
|---|---|
| *H01M 50/166* | (2021.01) |
| *H01M 10/058* | (2010.01) |
| *B23K 37/04* | (2006.01) |
| *B23K 26/20* | (2014.01) |
| *H01M 10/0525* | (2010.01) |
| *H01M 50/169* | (2021.01) |

(52) U.S. Cl.
CPC ........... *H01M 50/166* (2021.01); *B23K 26/20* (2013.01); *B23K 37/04* (2013.01); *H01M 10/058* (2013.01); *H01M 10/0525* (2013.01); *H01M 50/169* (2021.01); *H01M 2220/20* (2013.01)

(58) Field of Classification Search
CPC ............. H01M 50/166; H01M 10/058; H01M 50/169; H01M 10/04; B23K 37/04
See application file for complete search history.

(56) References Cited

U.S. PATENT DOCUMENTS

| | | | |
|---|---|---|---|
| 2013/0101877 A1* | 4/2013 | Kohno | ................ H01M 50/172 429/94 |
| 2016/0260946 A1* | 9/2016 | Ochi | ................. H01M 10/6557 |

FOREIGN PATENT DOCUMENTS

| | | |
|---|---|---|
| JP | 2013-187087 A | 9/2013 |
| JP | 2014-127400 A | 7/2014 |

\* cited by examiner

*Primary Examiner* — Ladan Mohaddes
(74) *Attorney, Agent, or Firm* — Sughrue Mion, PLLC

(57) ABSTRACT

A manufacturing method includes the steps of: preparing a battery case having an opening; fabricating an assembly by inserting a wound electrode body and a lid which includes a terminal connected to the wound electrode body and which closes the opening into the battery case; sandwiching the battery case by a pressing jig in a state where the opening faces downward to close a gap between the battery case and the lid; disposing the assembly so that the terminal faces upward by inverting the assembly in a state where the battery case is sandwiched by the pressing jig; and welding the lid and the battery case to each other in a state where the terminal faces upward and the battery case is sandwiched by the pressing jig.

4 Claims, 20 Drawing Sheets

MANUFACTURING METHOD OF BATTERY AND BATTERY MANUFACTURING SYSTEM

CROSS REFERENCE TO RELATED APPLICATIONS

The present application claims priority on the basis of Japanese Patent Application No. 2018-078635 filed in Japan on Apr. 16, 2018, the entire contents of which are incorporated herein by reference.

BACKGROUND OF THE INVENTION

Field of the Invention

The present invention relates to a manufacturing method of a battery and to a battery manufacturing system.

Description of the Related Art

In recent years, lithium secondary batteries, nickel hydride batteries, and sealed batteries of other types are growing in importance as vehicle-mounted power supplies of electrical vehicles (EVs), hybrid vehicles (HVs), plug-in hybrid vehicles (PHVs), and the like and as power supplies for personal computers, mobile phones, and the like. In particular, sealed batteries constituting lithium-ion secondary batteries which are lightweight and which are capable of producing high energy density are being preferably used as a high-output power supply to be mounted to a vehicle and the like.

In a typical sealed battery, a battery component such as an electrode body in which a positive electrode and a negative electrode are laminated via a separator is housed in a battery case and an opening formed on the battery case is closed by a lid to seal the inside of the battery case. Examples of a method of sealing a battery case include welding the battery case and a lid to each other. For example, Japanese Patent Application Publication No. 2013-187087 discloses a technique involving fixing a battery case by a fixing jig in a state where a lid is fitted to the battery case and subsequently joining the battery case and the lid with each other by laser welding. In addition, Japanese Patent Application Publication No. 2014-127400 discloses a technique involving fixing a case body by a specialized welding jig and subsequently joining the case body and a lid with each other by laser welding.

When joining a battery case and a lid to each other by welding, a spatter is generated. The spatter may adhere to a jig that fixes the battery case. Since the jig is repeatedly used, repetitively performing welding may result in spatters accumulating on the jig. In addition, when fixing the battery case by the jig, the battery case and the jig may rub against each other and the jig may scrape a surface of the battery case. Battery cases are typically made of a metallic material. Therefore, metallic powder may accumulate on the jig. When fixing a battery case by a jig, a gap is present between the battery case and a lid. Therefore, when an assembly including a battery case and a lid is assembled to a jig and the battery case is fixed by the jig to eliminate a gap between the battery case and the lid, there is a risk that a metallic foreign object such as a spatter or a metallic powder adhered to the jig may penetrate into the battery case through the gap. When a metallic foreign object is present inside the battery case, depending on a shape or a size of the metallic foreign object, there is a risk that an internal short circuit may cause a short-circuit current to flow between a positive electrode and a negative electrode and a battery failure may occur.

SUMMARY OF THE INVENTION

The present invention has been made in consideration of the above and an object thereof is to provide a manufacturing method of a battery and a battery manufacturing system in which penetration of a metallic foreign object into a battery case is suppressed.

A manufacturing method of a battery according to the present invention includes the steps of: preparing a battery case having an opening; fabricating an assembly by inserting a battery component and a lid which includes a terminal connected to the battery component and which closes the opening into the battery case; sandwiching the battery case by a pressing jig in a state where the opening faces downward to close a gap between the battery case and the lid; disposing the assembly so that the terminal faces upward by inverting the assembly in a state where the battery case is sandwiched by the pressing jig; and welding the lid and the battery case to each other in a state where the terminal faces upward and the battery case is sandwiched by the pressing jig.

With the manufacturing method of a battery according to the present invention, in the sandwiching step, the battery case is sandwiched by a pressing jig in a state where the opening of the battery case faces downward to close a gap between the battery case and the lid. In this case, a metallic foreign object such as a spatter generated during welding or chip powder of the battery case which may be generated due to rubbing when sandwiching the battery case may accumulate on the pressing jig. However, since the battery case is sandwiched by the pressing jig in a state where the opening of the battery case faces downward, even when a metallic foreign object accumulated on the pressing jig drops from the pressing jig due to gravity, the possibility that the metallic foreign object penetrates into the battery case from the opening facing downward is virtually nonexistent. In addition, since the lid and the battery case are welded to each other in the welding step in a state where the terminal faces upward and the battery case is sandwiched by the pressing jig, the spatter generated during welding does not penetrate into the battery case. Furthermore, since the welding can be performed from above the battery case and the lid, a metallic foreign object is also prevented from accumulating or adhering to a welding device used for the welding and a decline in quality of welding is suppressed.

In a preferable aspect of the manufacturing method disclosed herein, in the assembly fabricating step, the assembly is fabricated by inserting the battery component and the lid into the battery case from below the battery case in a state where the opening faces downward. In this manner, since the opening of the battery case faces downward even when inserting the battery component and the lid into the battery case, the penetration of a foreign object into the battery case can be further suppressed.

In a preferable aspect of the manufacturing method disclosed herein, the battery case and the pressing jig are made of metallic materials, and in the sandwiching step, the battery case is held at a prescribed position in a state where the opening faces downward by a holding jig made of a resin material and, subsequently, the battery case is sandwiched by the pressing jig. In this manner, since a position of the battery case is adjusted by the holding jig made of a resin material, metallic powder is prevented from being generated from the battery case even when the holding jig and the battery case repeatedly rub against each other. Furthermore, since the battery case is sandwiched by the pressing jig in a state where the battery case is held at a prescribed position, position adjustment by the pressing jig need not be performed, the pressing jig and the battery case no longer repeatedly rub against each other, and scraping of the battery case by the pressing jig is suppressed.

In a preferable aspect of the manufacturing method disclosed herein, the lid is configured such that a cap having a first magnetic body is attachable thereto and an inlet for introducing a nonaqueous electrolyte into the battery case is formed therein, and the pressing jig is provided with a second magnetic body which imparts a magnetic force to the first magnetic body. The manufacturing method of a battery further includes a step of attaching the cap to the inlet in a state where the terminal faces downward and the battery case is sandwiched by the pressing jig and holding the cap to a prescribed position by the magnetic force. When an inlet is formed in the lid, creating a state where the terminal faces upward by inverting the assembly without closing the inlet creates a risk of penetration of a metallic foreign object through the inlet. Therefore, a metallic foreign object is prevented from penetrating into the battery case through the inlet by attaching the cap to the inlet in a state where the terminal faces downward and the battery case is sandwiched by the pressing jig. Furthermore, since the cap can be held at a prescribed position by a magnetic force, the cap can be readily attached and detached.

In addition, as another aspect which achieves the object described above, the present invention provides a battery manufacturing system. A battery manufacturing system disclosed herein includes: a case holding jig which includes a case main body and a pressing jig provided in the case main body, wherein the case main body has an insertion hole into which an assembly is to be inserted, the assembly includes a battery case having an opening, a battery component housed in the battery case, and a lid having a terminal connected to the battery component and closing the opening, and wherein the pressing jig is configured to sandwich the battery case in a state where the opening faces downward to close a gap between the battery case and the lid, the case holding jig being configured so as to be capable of holding the assembly; an assembling device which assembles the assembly to the case holding jig in a state where the opening faces downward; a first inverting device which disposes the assembly so that the terminal faces upward by inverting the assembly in a state where the battery case is sandwiched by the pressing jig; and a welding device which welds the lid and the battery case to each other in a state where the terminal faces upward and the battery case is sandwiched by the pressing jig.

With the battery manufacturing system according to the present invention, the case holding jig has a pressing jig which sandwiches the battery case in a state where the opening of the battery case faces downward to close a gap between the battery case and the lid. In this case, a metallic foreign object such as a spatter generated during welding or chip powder of the battery case which may be generated due to rubbing when sandwiching the battery case may accumulate on the pressing jig. However, since the battery case is sandwiched by the pressing jig in a state where the opening of the battery case faces downward, even when a metallic foreign object accumulated on the pressing jig drops from the pressing jig due to gravity, the possibility that the metallic foreign object penetrates into the battery case from the opening facing downward is virtually nonexistent. In addition, since the welding device welds the lid and the battery case to each other in a state where the terminal faces upward and the battery case is sandwiched by the pressing jig, the spatter generated during welding does not penetrate into the battery case. Furthermore, since the welding can be performed from above the battery case and the lid, a metallic foreign object is also prevented from accumulating or adhering to the welding device and a decline in quality of welding is suppressed.

In a preferable aspect of the battery manufacturing system disclosed herein, the battery manufacturing system further includes: an extracting device which extracts the assembly after completion of welding of the lid and the battery case to each other from the case holding jig; and a second inverting device which inverts the case holding jig from which the assembly has been extracted and disposes the case holding jig so that the insertion hole faces downward, wherein the case holding jig is configured so as to be repetitively movable between at least the assembling device, the first inverting device, the welding device, the extracting device, and the second inverting device in this order. In this manner, since the case holding jig can be repetitively used in sequence between prescribed devices, a battery can be manufactured with greater efficiency by using the case holding jig in plurality.

In a preferable aspect of the battery manufacturing system disclosed herein, the battery manufacturing system includes a cleaning device which is disposed on a downstream side of the second inverting device and on an upstream side of the assembling device, which is positioned below the case holding jig, and which cleans a periphery of the insertion hole in the case holding jig. While a metallic foreign object such as a spatter may accumulate in the periphery of the insertion hole when the battery case and the lid are welded to each other by the welding device, since the cleaning device cleans the periphery of the insertion hole in a state where the insertion hole faces downward, the case holding jig can be reused in a clean state.

In a preferable aspect of the battery manufacturing system disclosed herein, the lid is configured such that a cap having a first magnetic body is attachable thereto and an inlet for introducing a nonaqueous electrolyte into the battery case is formed therein, and the pressing jig is provided with a second magnetic body which imparts a magnetic force to the first magnetic body and which holds the cap at a prescribed position. The battery manufacturing system includes a cap attaching device which is disposed on an upstream side of the first inverting device and which attaches the cap to the inlet. Since the inlet is formed in the lid, creating a state where the terminal faces upward by inverting the assembly by the first inverting device without closing the inlet creates a risk of penetration of a metallic foreign object through the inlet. Therefore, a metallic foreign object is prevented from penetrating into the battery case through the inlet by attaching the cap to the inlet by the cap attaching device in a state where the terminal faces downward and the battery case is sandwiched by the pressing jig. Furthermore, since the cap can be held at the prescribed position by magnetic force, the cap can be readily attached and detached.

In a preferable aspect of the battery manufacturing system disclosed herein, the battery case has a bottom wall which opposes the lid, a pair of first walls which are connected to the bottom wall and which oppose each other, and a pair of second walls which are connected to the bottom wall and which oppose each other, the second walls having a smaller area than the first walls, the opening is formed in a rectangular shape, the battery case and the pressing jig are made of metallic materials, and the case holding jig includes a pair of first holding jigs which are provided in the case main body, which are made of a resin material, and which press the first walls and hold the battery case when the assembly is inserted into the case main body and a pair of second holding jigs which are provided in the case main body, which are made of a resin material, and which press the second walls and hold the battery case when the assembly is inserted into the case main body. Accordingly, position adjustment of the battery case (the assembly) is performed by the first holding jigs and the second holding jigs. In addition, since the first holding jigs and the second holding jigs are made of a resin material, metallic powder is prevented from being generated from the battery case even when the first holding jigs and the second holding jigs and the battery case repeatedly rub against each other.

In a preferable aspect of the battery manufacturing system disclosed herein, the case holding jig includes a first biasing member which biases the first holding jigs toward the first walls of the battery case and a second biasing member which biases the second holding jigs toward the second walls of the battery case. Accordingly, the battery case can be readily held by the case holding jig.

In a preferable aspect of the battery manufacturing system disclosed herein, the first biasing member has a first upper biasing member which biases the first holding jigs toward the first walls of the battery case and a first lower biasing member which is disposed below the first upper biasing member and which biases the first holding jigs toward the first walls of the battery case, and the second biasing member has a second upper biasing member which biases the second holding jigs toward the second walls of the battery case and a second lower biasing member which is disposed below the second upper biasing member and which biases the second holding jigs toward the second walls of the battery case. Accordingly, the battery case can be more reliably held by the case holding jig.

In a preferable aspect of the battery manufacturing system disclosed herein, the case main body includes an opposing wall which opposes the insertion hole, a first inclined surface which approaches the first walls of the assembly toward the opposing wall from the insertion hole in a state where the assembly is inserted into the case main body is formed in a tip portion of the first holding jigs on a side of the insertion hole, and a second inclined surface which approaches the second walls of the assembly toward the opposing wall from the insertion hole in a state where the assembly is inserted into the case main body is formed in a tip portion of the second holding jigs on a side of the insertion hole. Accordingly, the battery case can be more readily held by the case holding jig.

In a preferable aspect of the battery manufacturing system disclosed herein, the pressing jig includes a pair of first pressing jigs which press the first walls of the battery case and which sandwich the battery case when the battery case is held by the first holding jigs and the second holding jigs, and a pair of second pressing jigs which press the second walls of the battery case and which sandwich the battery case when the battery case is held by the first holding jigs and the second holding jigs. Since the pair of first pressing jigs sandwich the first walls of the battery case in a state where the battery case is held by the first holding jigs and the second holding jigs, position adjustment by the first pressing jigs need not be performed and the first pressing jigs and the battery case no longer repeatedly rub against each other. Therefore, scraping of the battery case by the first pressing jigs is suppressed. In addition, since the pair of second pressing jigs sandwich the second walls of the battery case in a state where the battery case is held by the first holding jigs and the second holding jigs, position adjustment by the second pressing jigs need not be performed and the second pressing jigs and the battery case no longer repeatedly rub against each other. Therefore, scraping of the battery case by the second pressing jigs is suppressed. In addition, the assembly is more reliably held by the case holding jig using the first pressing jigs and the second pressing jigs.

In a preferable aspect of the battery manufacturing system disclosed herein, the first pressing jigs include a fixing jig which is fixed to the case main body and a first movable jig which is configured so as to be movable with respect to the case main body and approachable to and separable from the fixing jig, the second pressing jigs include a second movable jig and a third movable jig which are configured so as to be movable with respect to the case main body, wherein the second movable jig is configured so as to be approachable to and separable from the third movable jig, and the third movable jig is configured so as to be approachable to and separable from the second movable jig. Accordingly, the first movable jig can be caused to approach the fixing jig and the first walls of the battery case can be sandwiched by the first movable jig and the fixing jig and, subsequently, the second movable jig and the third movable jig can be caused to approach the second walls of the battery case and the second walls of the battery case can be sandwiched by the second movable jig and the third movable jig.

In a preferable aspect of the battery manufacturing system disclosed herein, the case holding jig includes a first linking mechanism which operates the first movable jig, a second linking mechanism which operates the second movable jig, and a third linking mechanism which operates the third movable jig. The battery manufacturing system includes a first pressing portion which presses the first linking mechanism and which moves the first movable jig in a direction in which the first movable jig separates from the fixing jig, a second pressing portion which presses the second linking mechanism and which moves the second movable jig in a direction in which the second movable jig separates from the third movable jig, and a third pressing portion which presses the third linking mechanism and which moves the third movable jig in a direction in which the third movable jig separates from the second movable jig. As described above, the battery case can be mechanically sandwiched without having to use an electric actuator such as a solenoid in the case holding jig.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A preferred embodiment of the present invention will be described below. Matters required to carry out the present invention, with the exception of matters specifically mentioned in the present specification, can be understood to be design matters for a person with ordinary skill in the art based on prior art in the relevant technical field. The present invention can be carried out based on the contents disclosed in the present specification and common general technical knowledge in the relevant field. While a lithium-ion secondary battery will be described in detail below as an example of a battery, the description is not intended to limit the object of application of the present invention to a lithium-ion secondary battery.

Lithium Secondary Battery

Figure 1:
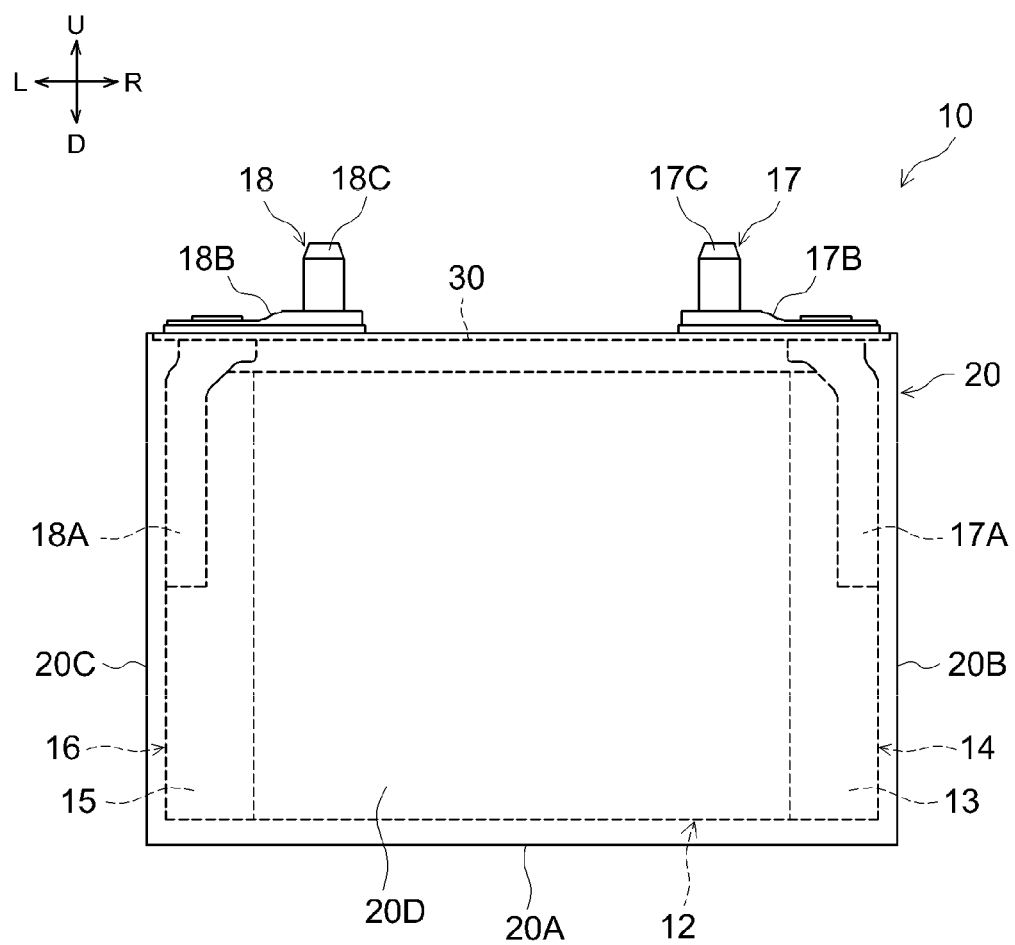
FIG. 1 is a front view showing a lithium secondary battery according to an embodiment.

As shown in FIG. 1, a lithium secondary battery 10 includes a battery case 20, a wound electrode body 12, a lid 30 provided on the battery case 20, and a nonaqueous electrolyte. It is to be understood that reference characters F, Rr, U, D, L, and R in the diagrams respectively denote front, rear, up, down, left, and right. However, these directions are only provided in order to facilitate understanding and are not intended to limit modes of installation of the lithium secondary battery 10 and the like as well as the present invention in any way whatsoever.

As shown in FIG. 1, the battery case 20 is formed in a flat and bottomed rectangular parallelopiped shape. The battery case 20 is a square case. The battery case 20 includes a bottom wall 20A, a right wall 20B, a left wall 20C, a front wall 20D, and a rear wall 20E (refer to FIG. 2). The bottom wall 20A opposes the lid 30. The right wall 20B extends upward from a right end of the bottom wall 20A. The left wall 20C extends upward from a left end of the bottom wall 20A. The right wall 20B and the left wall 20C oppose each other. The right wall 20B and the left wall 20C are examples of the second wall. The front wall 20D extends upward from a front end of the bottom wall 20A. The rear wall 20E extends upward from a rear end of the bottom wall 20A. The front wall 20D and the rear wall 20E oppose each other. The front wall 20D and the rear wall 20E are examples of the first wall. The right wall 20B and the left wall 20C have a smaller area than the front wall 20D and the rear wall 20E. The battery case 20 has an opening 22 (refer to FIG. 5). The opening 22 is defined by the right wall 20B, the left wall 20C, the front wall 20D, and the rear wall 20E. The opening 22 is formed in a rectangular shape. The battery case 20 houses the wound electrode body 12 and the nonaqueous electrolyte.

A material of the battery case 20 may be similar to that used in a conventional lithium secondary battery and is not limited to any particular material. For example, the battery case 20 is made of a light-weight metallic material with good thermal conductivity. Examples of such a metallic material include aluminum, stainless steel, and nickel-plated steel.

The lid 30 closes the opening 22 of the battery case 20. Specifically, as will be described later, the lid 30 is fitted into the opening 22 of the battery case 20 and a seam 24 (refer to FIG. 2) of an outer edge of the lid 30 and the battery case 20 in a periphery of the opening 22 is welded to each other. Accordingly, the lid 30 is fixed to the battery case 20 and the inside of the battery case 20 is sealed.

Figure 2:
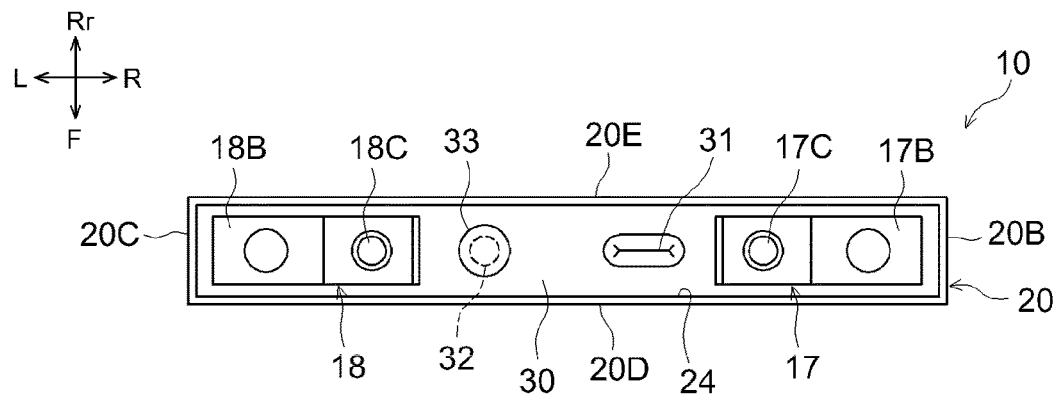
FIG. 2 is a top view of a lithium secondary battery according to an embodiment.

As shown in FIG. 2, an external shape of the lid 30 is an approximately rectangular shape that conforms to the shape of the opening 22. A gas release vent 31 for communicating the inside and outside of the battery case 20 to release internal pressure of the battery case 20 when the internal pressure rises is provided in a center portion of the lid 30. An inlet 32 for introducing a nonaqueous electrolyte into the battery case 20 during manufacturing of the battery is provided in the lid 30 to a side (in this example, a left side) of the gas release vent 31. A plug 33 covers the inlet 32 and is fixed by welding.

As shown in FIG. 1, the wound electrode body 12 includes a positive electrode sheet 14 having a positive electrode active material layer on an elongated positive electrode current collector 13 (for example, an aluminum foil), a negative electrode sheet 16 having a negative electrode active material layer on an elongated negative electrode current collector 15 (for example, a copper foil), and a separator sheet (not shown). The wound electrode body 12 is an example of the battery component. The wound electrode body 12 may be fabricated by laminating the positive electrode sheet 14 and the negative electrode sheet 16 while interposing the separator sheet therebetween, winding the laminated sheets in a lengthwise direction, and squashing the wound sheets. The wound electrode body 12 is housed in the battery case 20 in a posture which causes a winding axis thereof to lie on its side so as to extend in a left-right direction.

As the positive electrode active material, an oxide-based active material with a layered structure, an oxide-based active material with a spinel structure, and the like used in a positive electrode of a general lithium secondary battery can be favorably used. Representative examples of such active materials include lithium transition metal oxides such as lithium-cobalt-based oxides, lithium-nickel-based oxides, and lithium-manganese-based oxides.

In addition to the positive electrode active material described above, the positive electrode sheet 14 may further include an arbitrary component as necessary. Examples of the arbitrary component include a binder, a conductive assistant, a thickener, a dispersant, and a pH adjuster. Examples of binders include halogenated vinyl resins such as polyvinylidene fluoride (PVdF) and polyalkylene oxides such as polyethylene oxide (PEO). Examples of conductive assistants include carbon materials such as carbon black (typically, acetylene black), activated charcoal, graphite, and carbon fiber. Examples of pH adjusters include acidic substances such as phosphoric acid.

Examples of the negative electrode active material include carbon materials such as graphite, non-graphitizable carbon (hard carbon), and graphitizable carbon (soft carbon).

In addition to the negative electrode active material described above, the negative electrode sheet 16 may further include an arbitrary component as necessary. Examples of the arbitrary component include a binder, a thickener, and a dispersant. Examples of binders include rubbers such as styrene butadiene rubber (SBR). Examples of dispersants include celluloses such as carboxymethyl cellulose (CMC).

As the separator sheet, for example, a porous sheet, a nonwoven fabric, or the like made of a resin such as polyethylene (PE), polypropylene (PP), polyester, cellulose, or polyamide can be used.

The nonaqueous electrolyte interposed between the positive electrode sheet 14 and the negative electrode sheet 16 contains a supporting salt in an appropriate nonaqueous solvent, and conventionally known nonaqueous electrolytes in applications of a lithium secondary battery can be adopted without particular restriction. For example, as the nonaqueous solvent, ethylene carbonate (EC), diethyl carbonate (DEC), dimethyl carbonate (DMC), ethyl methyl carbonate (EMC), and the like can be used. In addition, for example, a lithium salt such as $LiPF_6$ can be preferably used as the supporting salt.

A positive electrode collector terminal 17 is welded and electrically connected to the positive electrode current collector 13 of the positive electrode sheet 14. A negative electrode collector terminal 18 is welded and electrically connected to the negative electrode current collector 15 of the negative electrode sheet 16. The positive electrode collector terminal 17 and the negative electrode collector terminal 18 are respectively connected to the wound electrode body 12. The positive electrode collector terminal 17 and the negative electrode collector terminal 18 respectively penetrate through-holes (not shown) provided at a right end and a left end of the lid 30 and are drawn outside from the inside of the battery case 20. In the present embodiment, the wound electrode body 12, the lid 30, the positive electrode collector terminal 17, and the negative electrode collector terminal 18 are respectively connected to each other and integrally provided. The positive electrode collector terminal 17 includes a positive electrode internal terminal 17A of which a large portion is positioned inside the battery case 20 and a positive electrode external terminal 17B which is positioned outside of the battery case 20. The positive electrode internal terminal 17A and the positive electrode external terminal 17B are electrically connected to each other. The negative electrode collector terminal 18 includes a negative electrode internal terminal 18A of which a large portion is positioned inside the battery case 20 and a negative electrode external terminal 18B which is positioned outside of the battery case 20. The negative electrode internal terminal 18A and the negative electrode external terminal 18B are electrically connected to each other.

A lower end of the positive electrode internal terminal 17A is bonded to the positive electrode current collector 13 by, for example, ultrasonic welding and is electrically connected thereto. A metallic material with good conductivity is favorable as a constituent material of the positive electrode internal terminal 17A and the positive electrode external terminal 17B and, typically, aluminum is used. A terminal bolt 17C which corresponds to a connection terminal for external connection is provided on the positive electrode external terminal 17B. The terminal bolt 17C protrudes upward from the lid 30.

A lower end of the negative electrode internal terminal 18A is bonded to the negative electrode current collector 15 by, for example, ultrasonic welding and is electrically connected thereto. A metallic material with good conductivity is favorable as a constituent material of the negative electrode internal terminal 18A and the negative electrode external terminal 18B and, typically, copper is used. A terminal bolt 18C which corresponds to a connection terminal for external connection is provided on the negative electrode external terminal 18B. The terminal bolt 18C protrudes upward from the lid 30.

Figure 3:
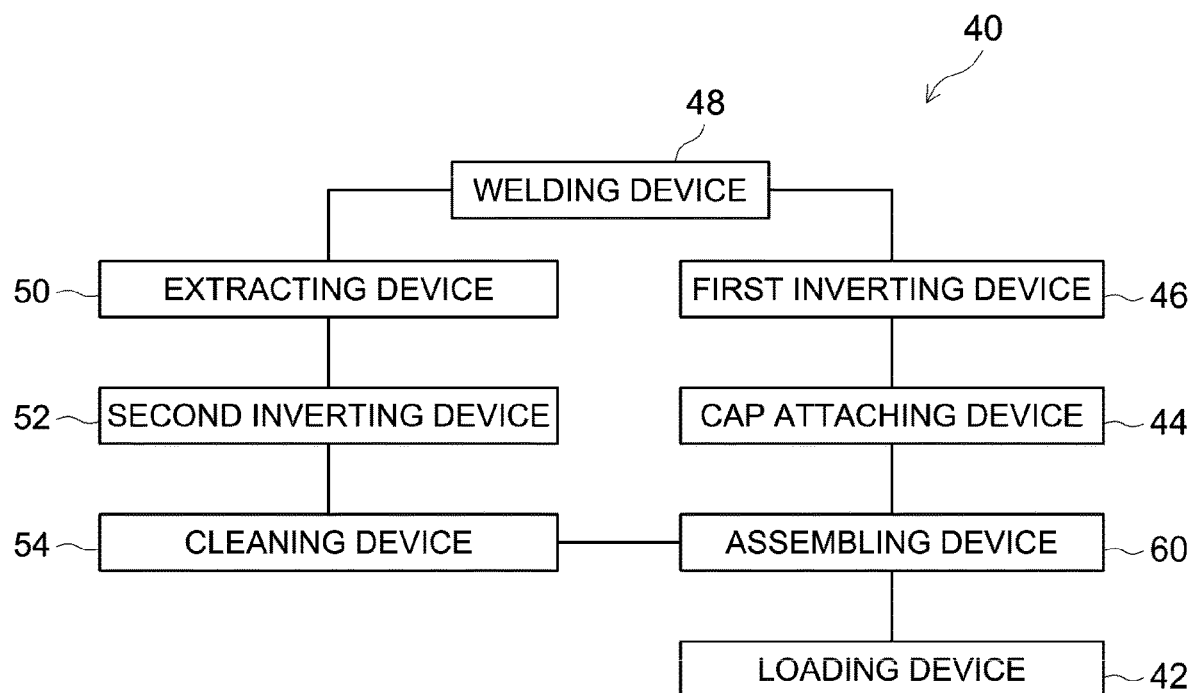
FIG. 3 is a block diagram of a battery manufacturing system according to an embodiment.

Next, a battery manufacturing system 40 for manufacturing the lithium secondary battery 10 will be described. As shown in FIG. 3, the battery manufacturing system 40 includes a loading device 42, an assembling device 60, a cap attaching device 44, a first inverting device 46, a welding device 48, an extracting device 50, a second inverting device 52, and a cleaning device 54. The loading device 42 is a device which successively loads an assembly 10A to the assembling device 60. The assembling device 60 is a device which assembles the assembly 10A to a case holding jig 62. The cap attaching device 44 is a device which attaches a cap 80 to the inlet 32 of the lid 30. The first inverting device 46 is a device which inverts the assembly 10A. The welding device 48 is a device which welds the lid 30 and the battery case 20 to each other. The extracting device 50 is a device which extracts the assembly 10A after welding thereof is completed from the case holding jig 62. The second inverting device 52 is a device which inverts the case holding jig 62. The cleaning device 54 is a device which cleans the case holding jig 62. Details of the respective devices of the battery manufacturing system 40 will be provided later.

Figure 4:
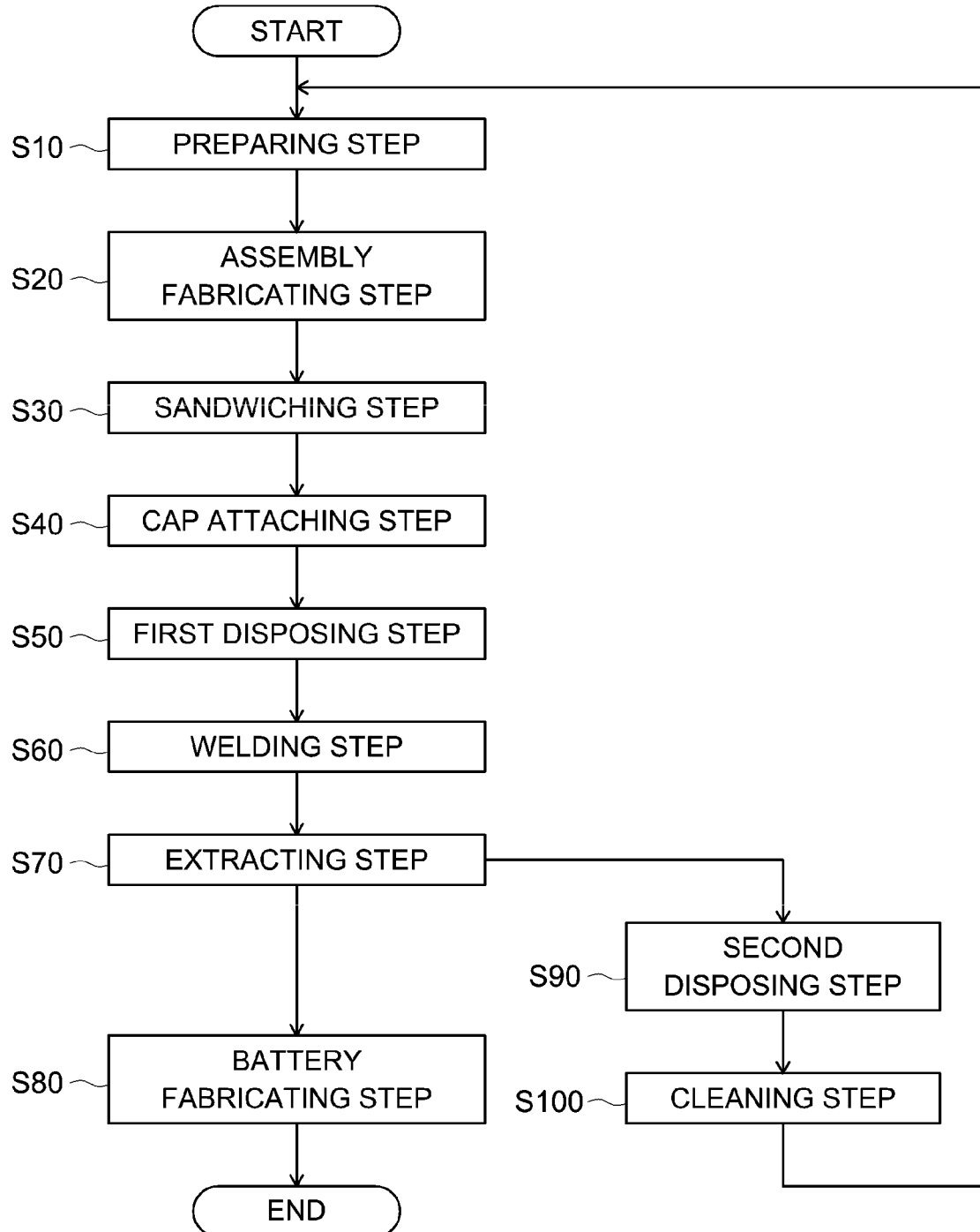
FIG. 4 is a flow chart showing a procedure of manufacturing a lithium secondary battery according to an embodiment.

Next, a procedure of manufacturing the lithium secondary battery 10 will be described with reference to a flow chart. FIG. 4 is a flow chart according to an embodiment. The manufacturing method of the lithium secondary battery 10 includes a preparing step S10, an assembly fabricating step S20, a sandwiching step S30, a cap attaching step S40, a first disposing step S50, a welding step S60, an extracting step S70, a battery fabricating step S80, a second disposing step S90, and a cleaning step S100. Hereinafter, each step will be described in detail.

Figure 5:
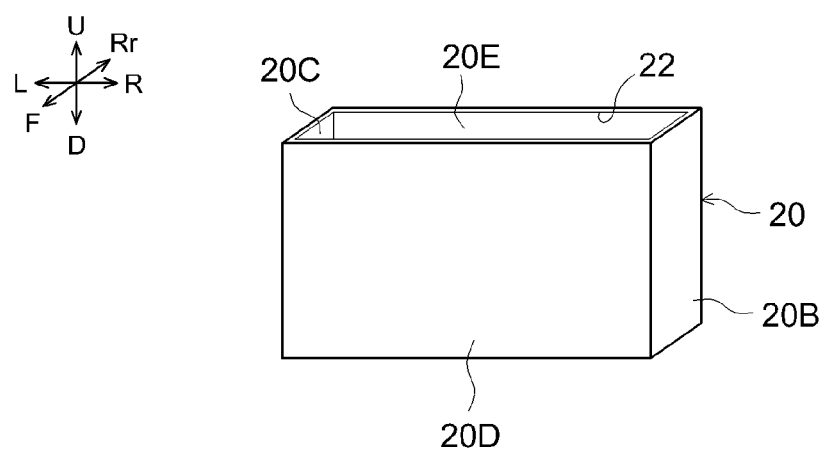
FIG. 5 is a perspective view of a battery case according to an embodiment.

First, in the preparing step S10, the battery case 20 having the opening 22 is prepared as shown in FIG. 5. The preparing step S10 is managed so that a metallic foreign object does not penetrate into the battery case 20 from the opening 22.

Figure 6:
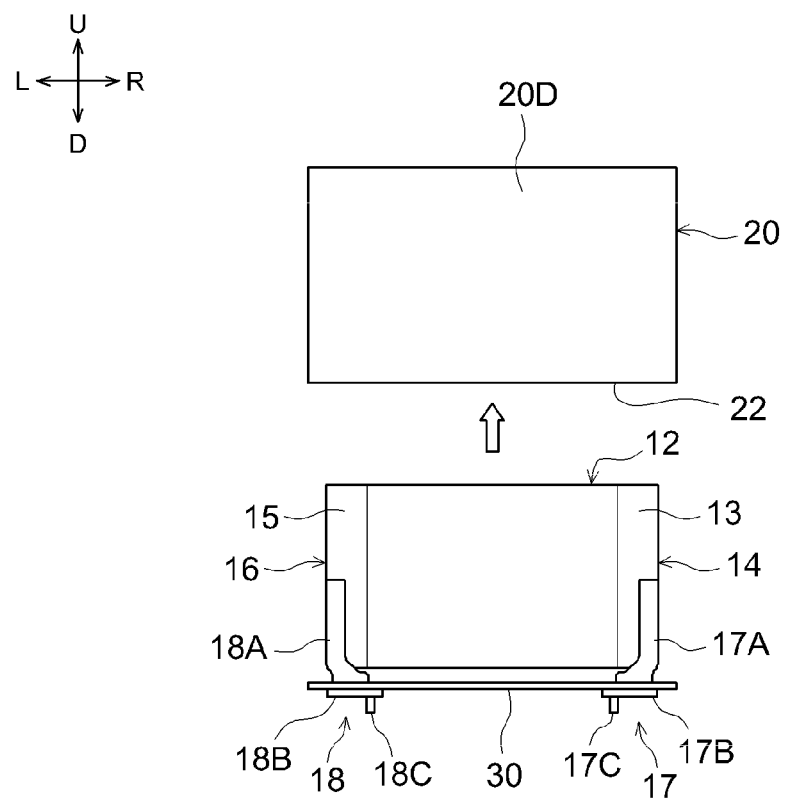
FIG. 6 is a schematic view showing a state where a wound electrode body and a lid are inserted into a battery case according to an embodiment in a state where an opening of the battery case faces downward.

Next, in the assembly fabricating step S20, the assembly 10A is fabricated. As shown in FIG. 6, the assembly 10A is fabricated by inserting the wound electrode body 12 and the lid 30 into the battery case 20 from below the battery case 20 in a state where the opening 22 of the battery case 20 faces downward. As described above, since the opening 22 of the battery case 20 faces downward, a metallic foreign object does not penetrate into the battery case 20 when fabricating the assembly 10A. Alternatively, the assembly 10A may be fabricated by inserting the wound electrode body 12 and the lid 30 into the battery case 20 from above the battery case 20 in a state where the opening 22 of the battery case 20 faces upward. In this case, the battery case 20 must be managed so that a metallic foreign object does not penetrate into the battery case 20. In the present embodiment, the wound electrode body 12 and the lid 30 are connected by the positive electrode collector terminal 17 and the negative electrode collector terminal 18, and the wound electrode body 12, the lid 30, the positive electrode collector terminal 17, and the negative electrode collector terminal 18 are integrated.

Figure 7:
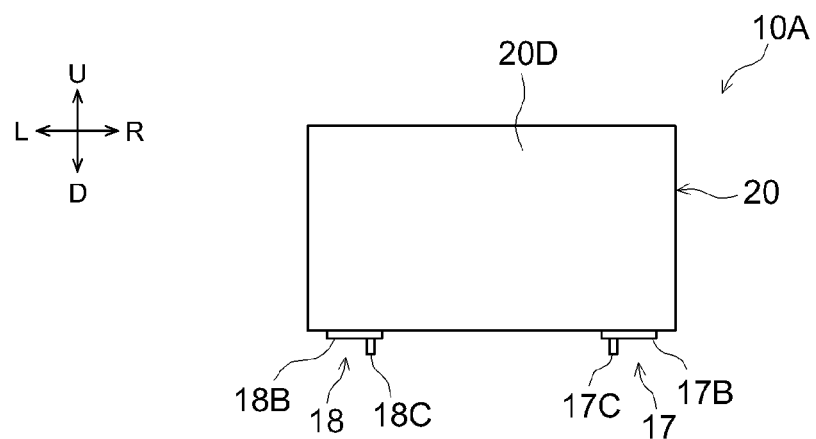
FIG. 7 is a schematic view showing an assembly according to an embodiment.
Figure 8:
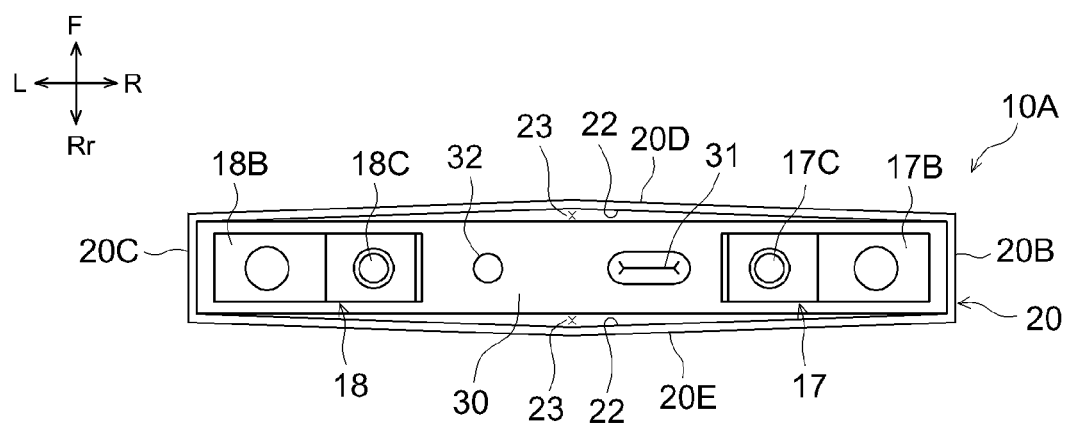
FIG. 8 is a bottom view of an assembly according to an embodiment.

As shown in FIG. 7, in the assembly 10A, the lid 30 is inserted into the battery case 20. In other words, the lid 30 does not protrude outward from the battery case 20. As shown in FIG. 8, when the wound electrode body 12 and the lid 30 are inserted into the battery case 20, a gap 23 is present between the battery case 20 and the lid 30. This is because the opening 22 of the battery case 20 is formed larger than an external shape of the lid 30. The opening 22 is formed oversized because when both the battery case 20 and the lid 30 are made of a metallic material, there is a risk that the battery case 20 and the lid 30 may rub against each other to generate metallic powder when inserting the lid 30 into the battery case 20. In other words, in the battery case 20 during normal times, a distance between the front wall 20D and the rear wall 20E of the battery case 20 increases closer to a center portion in a left-right direction of the battery case 20.

Figure 9:
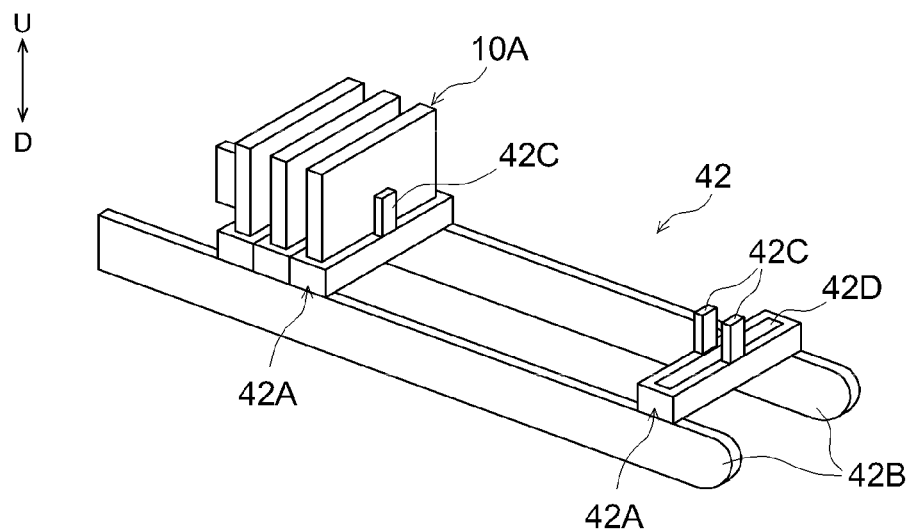
FIG. 9 is a perspective view showing a loading device according to an embodiment.

As shown in FIG. 9, the loading device 42 includes a plurality of holders 42A which hold the assembly 10A and a pair of transporting mechanisms 42B which transport the holders 42A. The holders 42A are configured so as to be movable on the transporting mechanisms 42B. The holders 42A include a pair of supporting walls 42C which support the assembly 10A and a recessed portion 42D into which the assembly 10A is inserted. The assembly 10A is held by the supporting walls 42C and the recessed portion 42D of the holders 42A when a part of the assembly 10A is inserted into the recessed portion 42D in a state where the lid 30 is positioned below or, in other words, a state where the opening 22 faces downward (a state where the positive electrode collector terminal 17 and the negative electrode collector terminal 18 face downward). In the present embodiment, the assembly 10A is transported to the assembling device 60 in a state where the opening 22 faces downward.

Next, in the sandwiching step S30, the battery case 20 is sandwiched by a pressing jig 64 in a state where the opening 22 of the battery case 20 faces downward to close the gap 23 between the battery case 20 and the lid 30. In the sandwiching step S30, the assembly 10A is assembled to the case holding jig 62 by the assembling device 60 (refer to FIG. 13A). The assembling device 60 includes the case holding jig 62 and an attaching jig 72. The assembling device 60 is disposed on a downstream side of the cleaning device 54.

Figure 10:
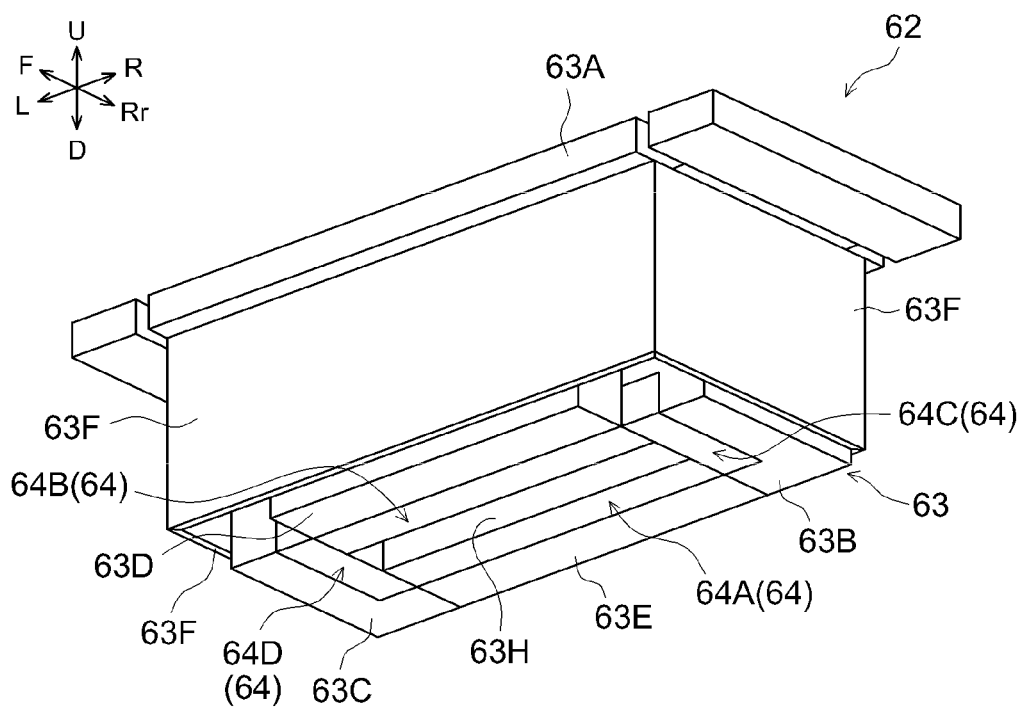
FIG. 10 is a perspective view of a case holding jig according to an embodiment.
Figure 11:
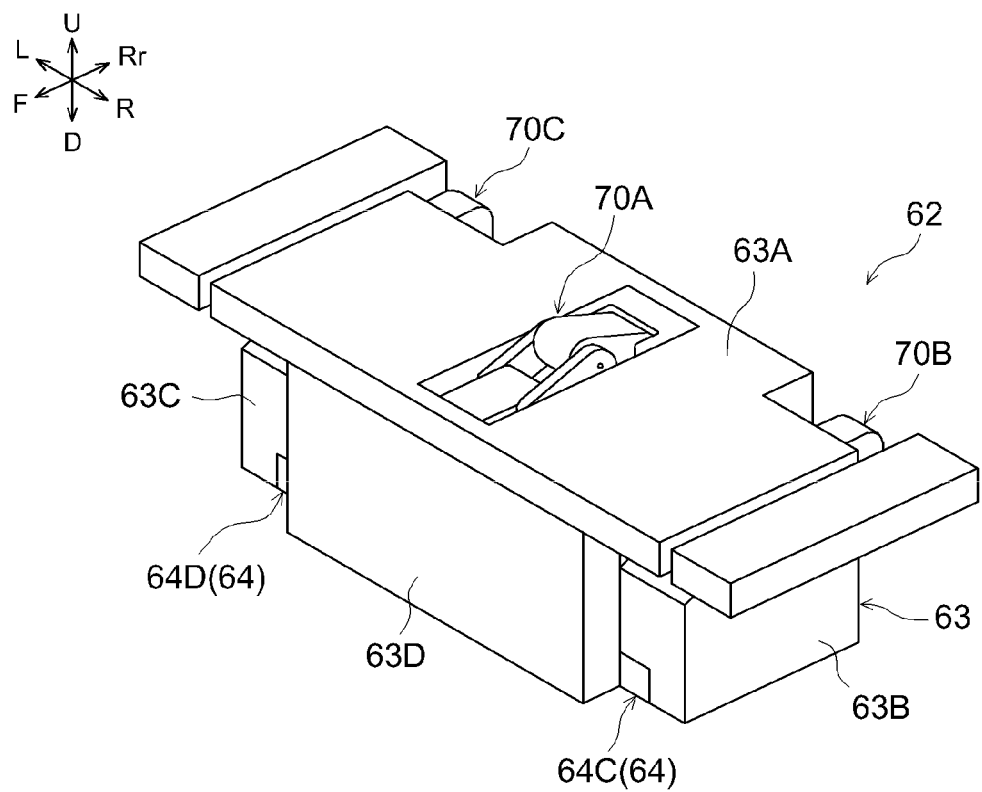
FIG. 11 is a perspective view of a case holding jig according to an embodiment.

As shown in FIGS. 10 and 11, the case holding jig 62 includes a case main body 63 and the pressing jig 64. The case holding jig 62 is configured so as to be capable of holding the assembly 10A. The case main body 63 includes a bottom wall 63A, a right wall 63B, a left wall 63C, a front wall 63D, and a rear wall 63E. The bottom wall 63A is an example of the opposing wall. The right wall 63B extends downward from a right end of the bottom wall 63A. The left wall 63C extends downward from a left end of the bottom wall 63A. The right wall 63B and the left wall 63C oppose each other. The front wall 63D extends downward from a front end of the bottom wall 63A. The rear wall 63E extends downward from a rear end of the bottom wall 63A. The front wall 63D and the rear wall 63E oppose each other. The right wall 63B and the left wall 63C have a smaller area than the front wall 63D and the rear wall 63E. The front wall 63D is configured so as to be approachable to and separable from the rear wall 63E. The front wall 63D is configured so as to be movable in a front-rear direction. The right wall 63B and the left wall 63C are configured so as to be approachable to and separable from the rear wall 63E. The right wall 63B and the left wall 63C are configured so as to be movable in a left-right direction. The right wall 63B, the left wall 63C, the front wall 63D, and the rear wall 63E are respectively provided with a cover 63F. An insertion hole 63H is formed on the case main body 63. The insertion hole 63H opposes the bottom wall 63A. The assembly 10A is inserted into the insertion hole 63H. Note that, in FIG. 11, illustration of the covers 63F is omitted for the sake of brevity.

Figure 12A:
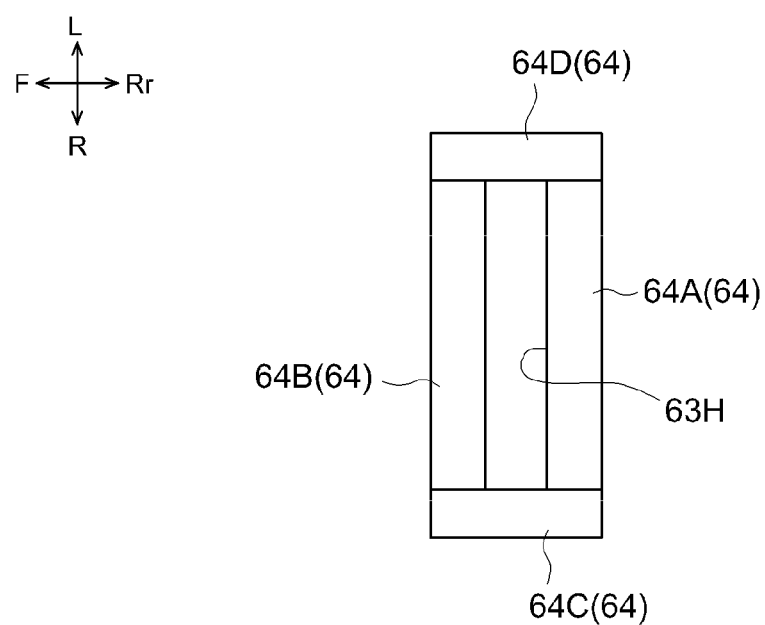
FIG. 12A is a bottom view schematically showing a state where an insertion hole of a case holding jig according to an embodiment has been narrowed.
Figure 12B:
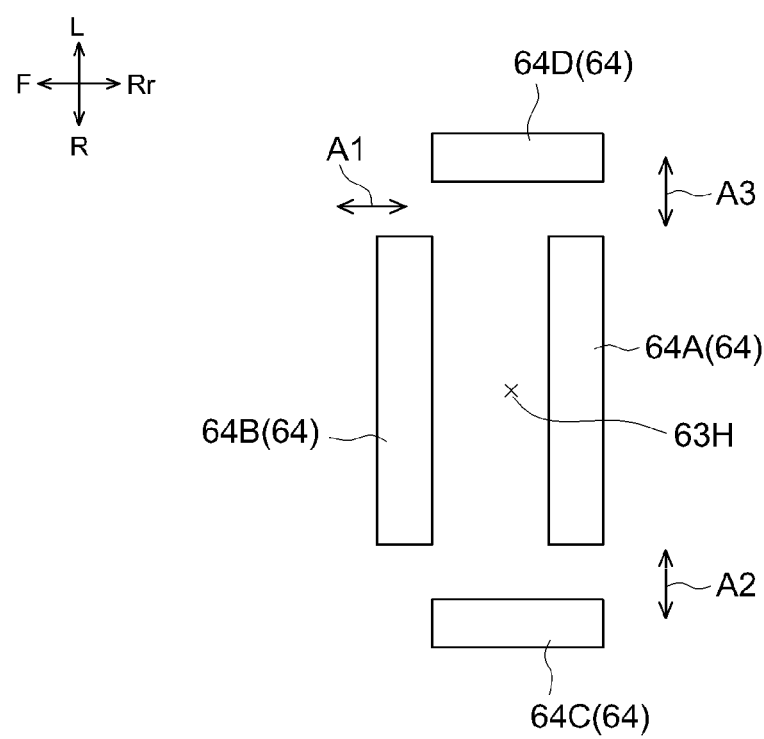
FIG. 12B is a bottom view schematically showing a state where an insertion hole of a case holding jig according to an embodiment has been widened.

The pressing jig 64 is provided in the case main body 63. The pressing jig 64 is made of a metallic material. The pressing jig 64 is made of a high hardness material (for example, molybdenum, copper, or stainless steel). The pressing jig 64 sandwiches the battery case 20 in a state where the opening 22 of the battery case 20 faces downward to close the gap 23 between the battery case 20 and the lid 30. The pressing jig 64 includes a fixing jig 64A, a first movable jig 64B, a second movable jig 64C, and a third movable jig 64D. In the present embodiment, the insertion hole 63H is defined by the pressing jig 64. More specifically, as shown in FIG. 12A, the insertion hole 63H is defined by the fixing jig 64A, the first movable jig 64B, the second movable jig 64C, and the third movable jig 64D. Since the first movable jig 64B, the second movable jig 64C, and the third movable jig 64D are configured so as to be movable relative to the fixing jig 64A as will be described later, the insertion hole 63H can be expanded as shown in FIG. 12B.

The fixing jig 64A is fixed to the case main body 63. The fixing jig 64A is provided on the rear wall 63E of the case main body 63. The fixing jig 64A presses the rear wall 20E of the battery case 20. The first movable jig 64B is configured so as to be movable relative to the case main body 63. As indicated by an arrow A1 in FIG. 12B, the first movable jig 64B is configured so as to be approachable to and separable from the fixing jig 64A. The first movable jig 64B is provided on the front wall 63D of the case main body 63. The first movable jig 64B presses the front wall 20D of the battery case 20. The fixing jig 64A and the first movable jig 64B are examples of the first pressing jig. When the battery case 20 is held by a first holding jig 66 and a second holding jig 67 to be described later, the fixing jig 64A and the first movable jig 64B respectively press the rear wall 20E and the front wall 20D of the battery case 20 and sandwich the battery case 20.

The second movable jig 64C is configured so as to be movable relative to the case main body 63. As indicated by an arrow A2 in FIG. 12B, the second movable jig 64C is configured so as to be approachable to and separable from the third movable jig 64D. The second movable jig 64C is provided on the right wall 63B of the case main body 63. The second movable jig 64C presses the right wall 20B of the battery case 20. The third movable jig 64D is configured so as to be movable relative to the case main body 63. As indicated by an arrow A3 in FIG. 12B, the third movable jig 64D is configured so as to be approachable to and separable from the second movable jig 64C. The third movable jig 64D is provided on the left wall 63C of the case main body 63. The third movable jig 64D presses the left wall 20C of the battery case 20. The second movable jig 64C and the third movable jig 64D are examples of the second pressing jig. When the battery case 20 is held by the first holding jig 66 and the second holding jig 67 to be described later, the second movable jig 64C and the third movable jig 64D respectively press the right wall 20B and the left wall 20C of the battery case 20 and sandwich the battery case 20.

Figure 13A:
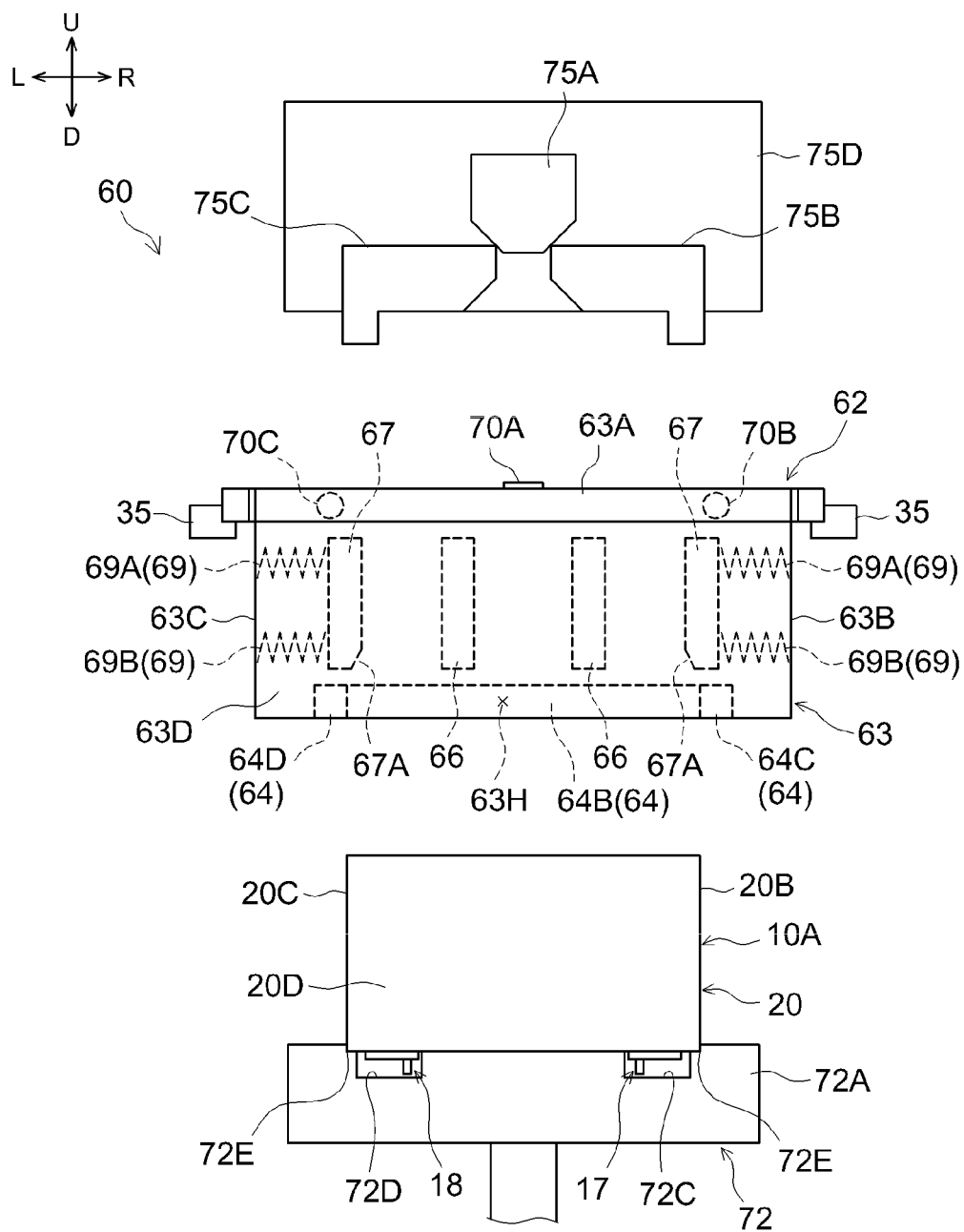
FIG. 13A is a front view showing a state where an assembly is inserted into a case holding jig.

As shown in FIG. 3, the case holding jig 62 is configured so as to be repetitively movable between the assembling device 60, the cap attaching device 44, the first inverting device 46, the welding device 48, the extracting device 50, the second inverting device 52, and the cleaning device 54 in this order. In other words, the case holding jig 62 is repetitively used in each of these devices. The case holding jig 62 circulates among the respective devices. In the cleaning device 54, the assembling device 60, and the cap attaching device 44, the case holding jig 62 moves in a state where the insertion hole 63H of the case main body 63 faces downward. In addition, in the welding device 48 and the extracting device 50, the case holding jig 62 moves in a state where the insertion hole 63H of the case main body 63 faces upward. As shown in FIG. 13A, the case holding jig 62 is configured so as to be movable along a rail 35.

Figure 13B:
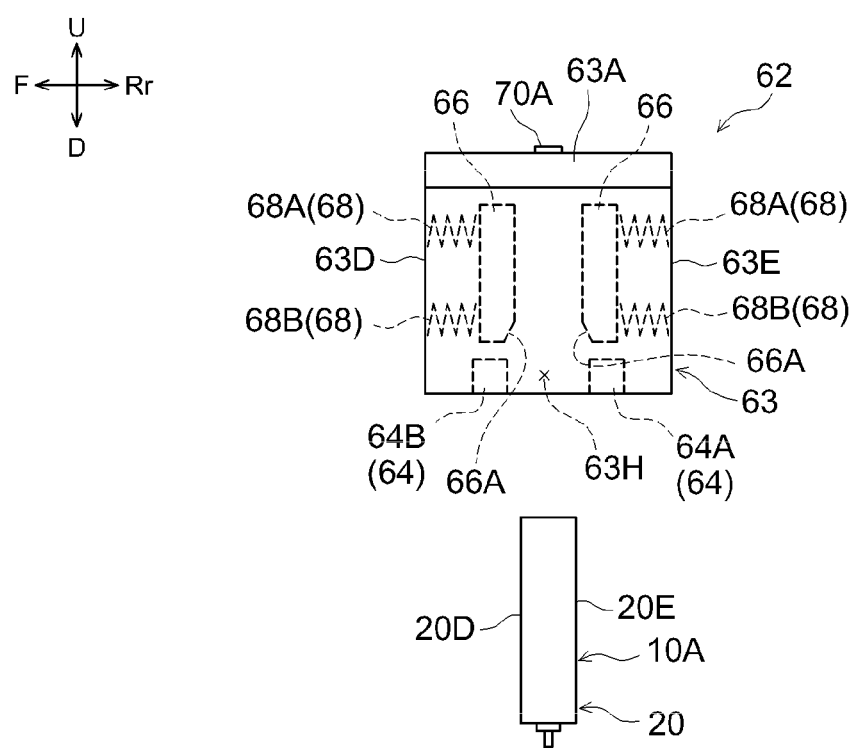
FIG. 13B is a side view showing a state where an assembly is inserted into a case holding jig.

As shown in FIGS. 13A and 13B, the case holding jig 62 includes the first holding jig 66, the second holding jig 67, first biasing members 68, and second biasing members 69. For example, compression springs may be used as the first biasing member 68 and the second biasing member 69. The first holding jig 66 and the second holding jig 67 are made of a resin material. For example, the first holding jig 66 and the second holding jig 67 are made of a resin material (such as nylon resin or the like). The first holding jig 66 and the second holding jig 67 are formed in an approximately rectangular parallelopiped shape. The first holding jig 66 and the second holding jig 67 are provided in the case main body 63. The first holding jig 66 and the second holding jig 67 are housed inside the case main body 63. While the case holding jig 62 is provided with four first holding jigs 66 and two second holding jigs 67 in the present embodiment, the numbers of the first holding jig 66 and the second holding jig 67 are not limited thereto. Note that, in FIG. 13B, illustration of the attaching jig 72 is omitted for the sake of brevity.

Figure 14A:
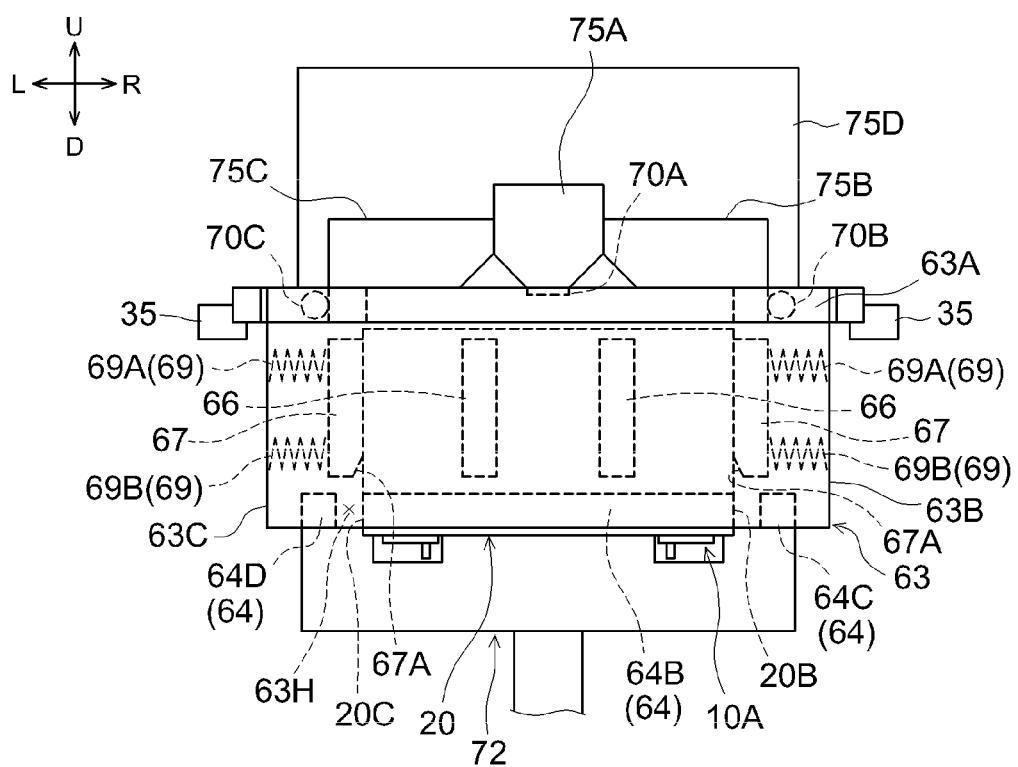
FIG. 14A is a front view showing a state where an assembly has been inserted into a case holding jig.
Figure 14B:
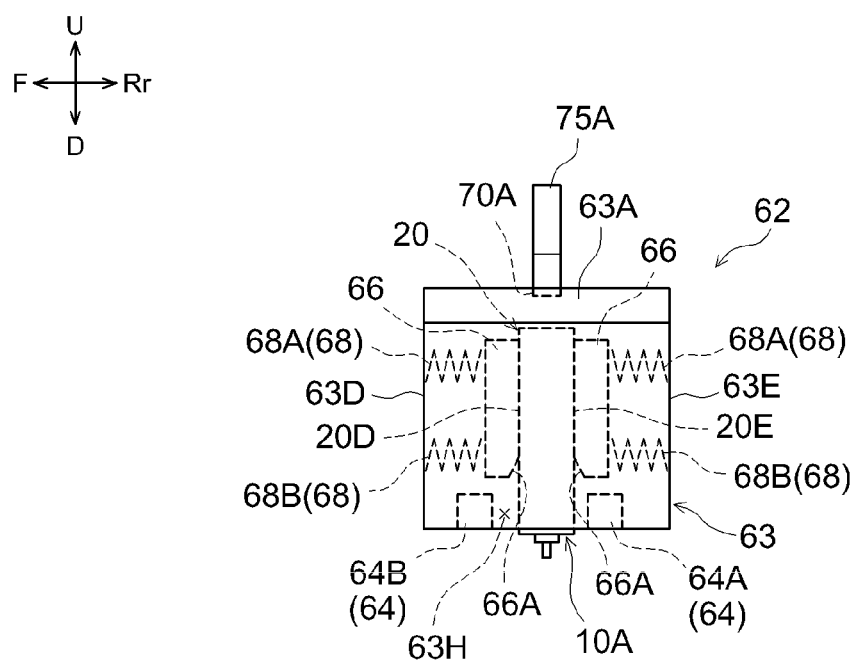
FIG. 14B is a side view showing a state where an assembly has been inserted into a case holding jig.

As shown in FIGS. 14A and 14B, the first holding jig 66 presses the front wall 20D and the rear wall 20E and holds the battery case 20 when the assembly 10A is inserted into the case main body 63. The second holding jig 67 presses the right wall 20B and the left wall 20C and holds the battery case 20 when the assembly 10A is inserted into the case main body 63. The assembly 10A is held at a prescribed position in the case main body 63 by the first holding jig 66 and the second holding jig 67. When the assembly 10A is held at the prescribed position in the case main body 63 by the first holding jig 66 and the second holding jig 67, the gap 23 between the battery case 20 and the lid 30 is not closed. In other words, the assembly 10A is held at the prescribed position in a state where the opening 22 of the battery case 20 faces downward. Note that, in FIG. 14B, illustration of the attaching jig 72 is omitted for the sake of brevity.

As shown in FIG. 14B, a first inclined surface 66A which approaches the front wall 20D or the rear wall 20E of the assembly 10A toward the bottom wall 63A from the insertion hole 63H in a state where the assembly 10A is inserted into the case main body 63 is formed in a tip portion on a side of the insertion hole 63H in the first holding jig 66. The first inclined surface 66A of the first holding jig 66 provided on a side of the front wall 63D of the case main body 63 is inclined so as to face upward the further rearward. The first inclined surface 66A of the first holding jig 66 provided on a side of the rear wall 63E of the case main body 63 is inclined so as to face upward the further forward.

As shown in FIG. 14A, a second inclined surface 67A which approaches the left wall 20C or the right wall 20B of the assembly 10A toward the bottom wall 63A from the insertion hole 63H in a state where the assembly 10A is inserted into the case main body 63 is formed in a tip portion on a side of the insertion hole 63H in the second holding jig 67. The second inclined surface 67A of the second holding jig 67 provided on a side of the left wall 63C of the case main body 63 is inclined so as to face upward the further rightward. The second inclined surface 67A of the second holding jig 67 provided on a side of the right wall 63B of the case main body 63 is inclined so as to face upward the further leftward.

As shown in FIG. 13B, the first biasing members 68 are connected to the first holding jig 66. The first biasing members 68 are fixed to the case main body 63. Among the first biasing members 68, the first biasing member 68 fixed to the front wall 63D of the case main body 63 biases the first holding jig 66 toward the front wall 20D of the battery case 20 (in other words, rearward or toward the rear wall 63E of the case main body 63). Among the first biasing members 68, the first biasing member 68 fixed to the rear wall 63E of the case main body 63 biases the first holding jig 66 toward the rear wall 20E of the battery case 20 (in other words, forward or toward the front wall 63D of the case main body 63). The first biasing members 68 include an upper first biasing member 68A and a lower first biasing member 68B. The lower first biasing member 68B is disposed below the upper first biasing member 68A.

As shown in FIG. 13A, the second biasing members 69 are connected to the second holding jig 67. The second biasing members 69 are fixed to the case main body 63. Among the second biasing members 69, the second biasing member 69 fixed to the left wall 63C of the case main body 63 biases the second holding jig 67 toward the left wall 20C of the battery case 20 (in other words, rightward or toward the right wall 63B of the case main body 63). Among the second biasing members 69, the second biasing member 69 fixed to the right wall 63B of the case main body 63 biases the second holding jig 67 toward the right wall 20B of the battery case 20 (in other words, leftward or toward the left wall 63C of the case main body 63). The second biasing members 69 include an upper second biasing member 69A and a lower second biasing member 69B. The lower second biasing member 69B is disposed below the upper second biasing member 69A.

As shown in FIG. 11, the case holding jig 62 includes a first linking mechanism 70A, a second linking mechanism 70B, and a third linking mechanism 70C. The first linking mechanism 70A is connected to the front wall 63D of the case main body 63. The first linking mechanism 70A is configured so as to be capable of moving the front wall 63D in a front-rear direction. When the first linking mechanism 70A is pressed by a first pressing portion 75A (refer to FIG. 13A) to be described later, the front wall 63D of the case main body 63 moves in a direction in which the front wall 63D separates from the rear wall 63E (in this case, forward). In other words, the first movable jig 64B provided on the front wall 63D moves in a direction in which the first movable jig 64B separates from the fixing jig 64A. On the other hand, when pressing of the first linking mechanism 70A by the first pressing portion 75A is released, the front wall 63D of the case main body 63 moves in a direction in which the front wall 63D approaches the rear wall 63E (in this case, rearward). In other words, the first movable jig 64B moves in a direction in which the first movable jig 64B approaches the fixing jig 64A.

As shown in FIG. 11, the second linking mechanism 70B is connected to the right wall 63B of the case main body 63. The second linking mechanism 70B is configured so as to be capable of moving the right wall 63B in a left-right direction. When the second linking mechanism 70B is pressed by a second pressing portion 75B (refer to FIG. 13A) to be described later, the right wall 63B of the case main body 63 moves in a direction in which the right wall 63B separates from the left wall 63C (in this case, rightward). In other words, the second movable jig 64C provided on the right wall 63B moves in a direction in which the second movable jig 64C separates from the third movable jig 64D. On the other hand, when pressing of the second linking mechanism 70B by the second pressing portion 75B is released, the right wall 63B of the case main body 63 moves in a direction in which the right wall 63B approaches the left wall 63C (in this case, leftward). In other words, the second movable jig 64C moves in a direction in which the second movable jig 64C approaches the third movable jig 64D.

As shown in FIG. 11, the third linking mechanism 70C is connected to the left wall 63C of the case main body 63. The third linking mechanism 70C is configured so as to be capable of moving the left wall 63C in a left-right direction. When the third linking mechanism 70C is pressed by a third pressing portion 75C (refer to FIG. 13A) to be described later, the left wall 63C of the case main body 63 moves in a direction in which the left wall 63C separates from the right wall 63B (in this case, leftward). In other words, the third movable jig 64D provided on the left wall 63C moves in a direction in which the third movable jig 64D separates from the second movable jig 64C. On the other hand, when pressing of the third linking mechanism 70C by the third pressing portion 75C is released, the left wall 63C of the case main body 63 moves in a direction in which the left wall 63C approaches the right wall 63B (in this case, rightward). In other words, the third movable jig 64D moves in a direction in which the third movable jig 64D approaches the second movable jig 64C.

The attaching jig 72 attaches the assembly 10A to the case holding jig 62 in a state where the opening 22 of the battery case 20 faces downward. As shown in FIG. 13A, the attaching jig 72 includes a main body portion 72A which holds the assembly 10A in a state where the opening 22 of the battery case 20 faces downward and an elevating portion (not shown) which is connected to the main body portion 72A and which elevates or lowers the main body portion 72A in an up-down direction. A first recessed portion 72C which houses the positive electrode collector terminal 17 of the assembly 10A and a second recessed portion 72D which houses the negative electrode collector terminal 18 of the assembly 10A are formed in the main body portion 72A. A stepped portion 72E for positioning the assembly 10A is formed in the main body portion 72A. The assembly 10A transported by the loading device 42 is disposed on the attaching jig 72 by, for example, a robotic arm.

As shown in FIG. 13A, the assembling device 60 includes the first pressing portion 75A, the second pressing portion 75B, the third pressing portion 75C, and a supporting member 75D. The first pressing portion 75A, the second pressing portion 75B, and the third pressing portion 75C are provided on the supporting member 75D. The supporting member 75D is configured so as to be movable in an up-down direction. The first pressing portion 75A is configured so as to be movable in an up-down direction relative to the supporting member 75D. The second pressing portion 75B and the third pressing portion 75C are configured so as to be movable in a left-right direction relative to the supporting member 75D. The second pressing portion 75B is provided with a biasing member (not shown) which biases the second pressing portion 75B toward the third pressing portion 75C. The third pressing portion 75C is provided with a biasing member (not shown) which biases the third pressing portion 75C toward the second pressing portion 75B.

When the first pressing portion 75A moves downward, the first pressing portion 75A causes the second pressing portion 75B to move rightward and the third pressing portion 75C to move leftward. Accordingly, the second pressing portion 75B presses the second linking mechanism 70B and the third pressing portion 75C presses the third linking mechanism 70C. As a result, the second movable jig 64C and the third movable jig 64D move so as to separate from each other. As the first pressing portion 75A moves further downward, the first pressing portion 75A presses the first linking mechanism 70A. As a result, the first movable jig 64B moves in a direction in which the first movable jig 64B separates from the fixing jig 64A. At this point, the insertion hole 63H is widened as shown in FIG. 12B.

On the other hand, when the first pressing portion 75A moves upward in a state where the first linking mechanism 70A to the third linking mechanism 70C are respectively pressed, since the first pressing portion 75A separates from the first linking mechanism 70A, the first movable jig 64B moves in a direction in which the first movable jig 64B approaches the fixing jig 64A. As the first pressing portion 75A moves further upward, the second pressing portion 75B is moved leftward by the biasing member and the third pressing portion 75C is moved rightward by the biasing member. Accordingly, the second pressing portion 75B separates from the second linking mechanism 70B and the third pressing portion 75C separates from the third linking mechanism 70C. As a result, the second movable jig 64C and the third movable jig 64D move so as to approach each other.

Figure 15A:
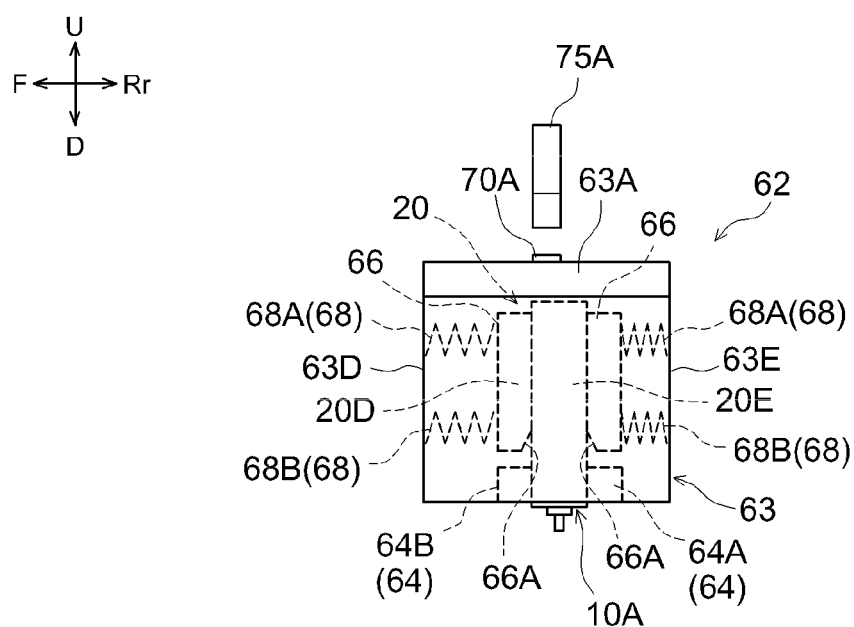
FIG. 15A is a side view showing a state where a battery case is sandwiched by a fixing jig and a first movable jig.
Figure 15B:
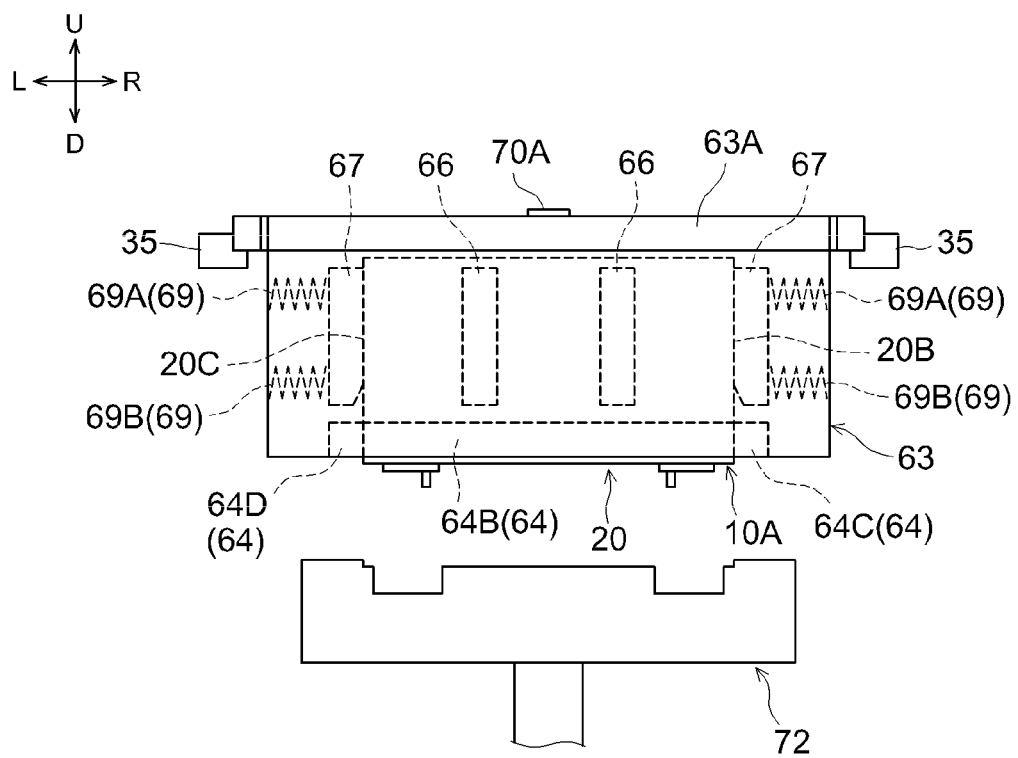
FIG. 15B is a front view showing a state where a battery case is sandwiched by a fixing jig, a first movable jig, a second movable jig, and a third movable jig.

In the sandwiching step S30, the assembly 10A is assembled to the case holding jig 62 as follows. First, as shown in FIG. 13A, the assembly 10A transported by the loading device 42 is disposed on the attaching jig 72. At this point, the gap 23 is present between the battery case 20 and the lid 30. Subsequently, the supporting member 75D is moved downward, the first linking mechanism 70A to the third linking mechanism 70C are pressed by the first pressing portion 75A to the third pressing portion 75C, and the insertion hole 63H of the case main body 63 is widened as shown in FIG. 12B. In this state, the attaching jig 72 is moved upward and the assembly 10A is inserted into the case main body 63 (refer to FIG. 14A). The assembly 10A is held at a prescribed position by the first holding jig 66 and the second holding jig 67 provided inside the case main body 63. Subsequently, when the first pressing portion 75A is moved upward and the first pressing portion 75A separates from the first linking mechanism 70A, the first movable jig 64B moves in a direction in which the first movable jig 64B approaches the fixing jig 64A. Accordingly, the battery case 20 is sandwiched by the first movable jig 64B and the fixing jig 64A (refer to FIG. 15A). Furthermore, by moving the first pressing portion 75A upward, moving the second pressing portion 75B leftward by the biasing member, and moving the third pressing portion 75C rightward by the biasing member, the second movable jig 64C and the third movable jig 64D move in a direction of approaching each other. Accordingly, the battery case 20 is sandwiched by the second movable jig 64C and the third movable jig 64D (refer to FIG. 15B). In this manner, due to the battery case 20 being sandwiched by the first movable jig 64B, the fixing jig 64A, the second movable jig 64C, and the third movable jig 64D, the gap 23 between the battery case 20 and the lid 30 is closed. Subsequently, the attaching jig 72 is moved downward. The case holding jig 62 holding the assembly 10A moves to the cap attaching device 44 along the rail 35. Note that, in FIG. 15A, illustration of the attaching jig 72 is omitted for the sake of brevity.

Figure 16:
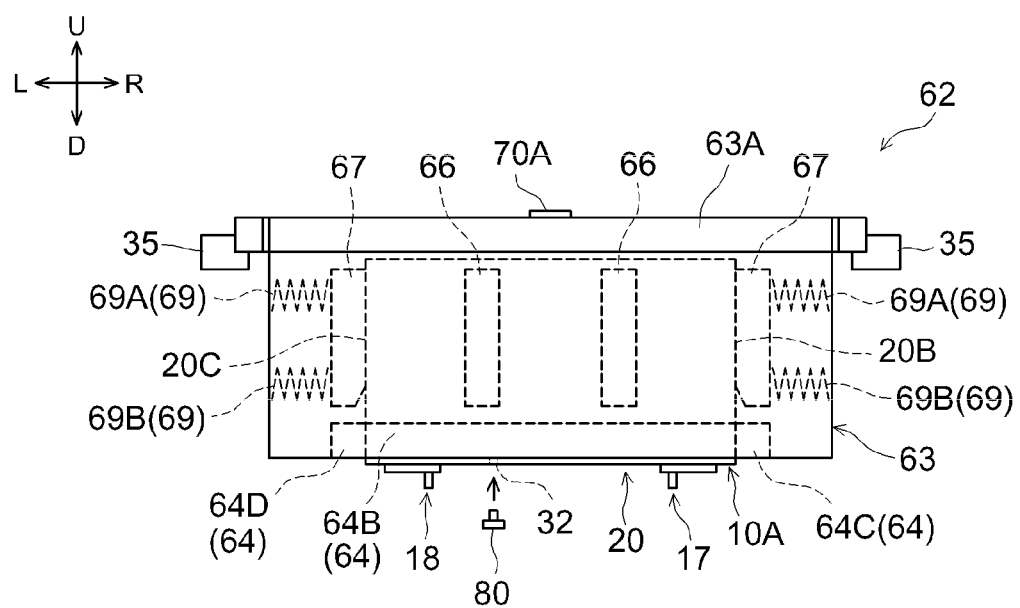
FIG. 16 is a front view showing a state where a cap is attached to an inlet.

Next, as shown in FIG. 16, in the cap attaching step S40, the cap 80 is attached to the inlet 32 of the lid 30. The cap attaching device 44 attaches the cap 80 to the inlet 32 when the case holding jig 62 is positioned above the cap attaching device 44. More specifically, the cap 80 is attached to the inlet 32 in a state where the positive electrode collector terminal 17 and the negative electrode collector terminal 18 face downward (in other words, a state where the inlet 32 faces downward) and the battery case 20 is sandwiched by the pressing jig 64. In this case, while the cap 80 is made of a resin material, an iron core is inserted into the cap 80. The iron core is an example of the first magnetic body. The cap 80 is configured so as to be attachable to the inlet 32. In addition, the fixing jig 64A and the first movable jig 64B are respectively provided with magnets. The magnets are an example of the second magnetic body. The magnets impart a magnetic force to the iron core. Therefore, when the cap 80 is attached to the inlet 32 in a state where the battery case 20 is sandwiched by the fixing jig 64A and the first movable jig 64B, the cap 80 is held at a prescribed position by the magnetic force applied to the iron core of the cap 80. The cap attaching device 44 is disposed on a downstream side of the assembling device 60.

Figure 17:
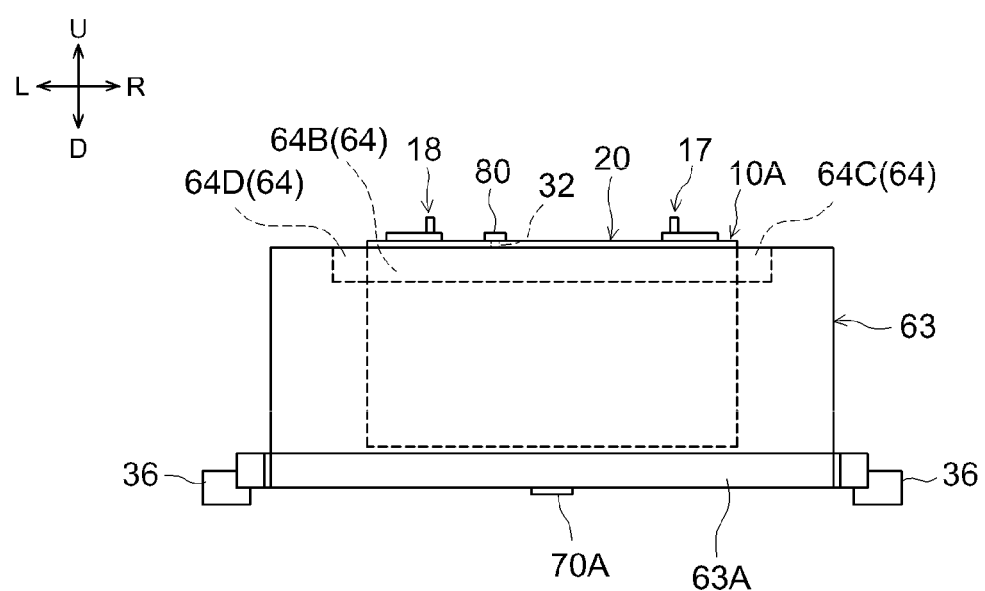
FIG. 17 is a front view showing a state where a case holding jig holding an assembly is inverted and a positive electrode collector terminal and a negative electrode collector terminal of the assembly are facing upward.

Next, as shown in FIG. 17, in the first disposing step S50, the first inverting device 46 inverts the assembly 10A in a state where the battery case 20 is sandwiched by the pressing jig 64. In other words, the first inverting device 46 inverts the case holding jig 62. Accordingly, the assembly 10A is disposed so as to create a state where the positive electrode collector terminal 17 and the negative electrode collector terminal 18 face upward. A configuration of the first inverting device 46 is not particularly limited and conventionally known configurations can be adopted. The first inverting device 46 is disposed on a downstream side of the cap attaching device 44. The case holding jig 62 after the inversion is configured so as to be transportable along a rail 36.

Next, in the welding step S60, the lid 30 and the battery case 20 are welded to each other in a state where the positive electrode collector terminal 17 and the negative electrode collector terminal 18 face upward and the battery case 20 is sandwiched by the pressing jig 64. The welding of the lid 30 and the battery case 20 to each other is performed by the welding device 48 (refer to FIG. 3). An example of the welding device 48 is a laser welding device. The laser welding device is a device for laser-welding two members to each other and, for example, includes a galvano scanner. The welding device 48 laser-welds the seam 24 (refer to FIG. 2) of the outer edge of the lid 30 and the battery case 20 in a periphery of the opening 22. The welding device 48 is disposed on a downstream side of the first inverting device 46.

Next, in the extracting step S70, the assembly 10A is extracted from the case holding jig 62. The extracting device 50 extracts the assembly 10A of which the welding of the lid 30 and the battery case 20 to each other has been completed from the case holding jig 62. The extracting device 50 includes an arm portion (not shown) which grips the assembly 10A and extracts the assembly 10A from the case holding jig 62. The extracting device 50 includes, below the arm portion, pressing members similar to the first pressing portion 75A to the third pressing portion 75C of the assembling device 60, and the extracting device 50 is capable of releasing the held state of the assembly 10A by pressing the first linking mechanism 70A to the third linking mechanism 70C from below the case holding jig 62 by the pressing members. The arm portion moves the extracted assembly 10A to a battery manufacturing line. The case holding jig 62 from which the assembly 10A has been extracted is transported to the second inverting device 52. At this point, the insertion hole 63H of the case main body 63 is narrowed as shown in FIG. 12A. The extracting device 50 is disposed on a downstream side of the welding device 48.

Next, in the battery fabricating step S80, the lithium secondary battery 10 is fabricated using the assembly 10A. The battery fabricating step S80 includes a step of cleaning a surface of the assembly 10A, a step of introducing the nonaqueous electrolyte into the assembly 10A and sealing the inlet 32 with the plug 33, a step of subjecting the assembly 10A to initial charging, and the like.

Next, in the second disposing step S90, the second inverting device 52 (refer to FIG. 3) inverts the case holding jig 62. Accordingly, the case holding jig 62 is disposed so as to create a state where the insertion hole 63H of the case main body 63 faces downward. A configuration of the second inverting device 52 is not particularly limited and conventionally known configurations can be adopted. In the present embodiment, the second inverting device 52 and the first inverting device 46 share a same configuration. The second inverting device 52 is disposed on a downstream side of the extracting device 50.

Figure 18:
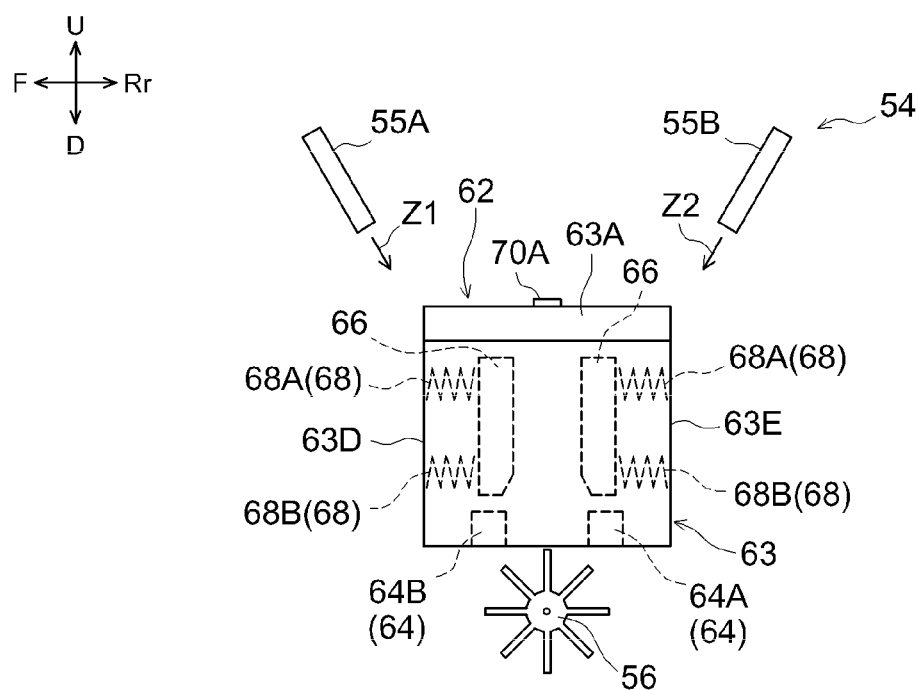
FIG. 18 is a side view showing a cleaning device according to an embodiment.

Next, in the cleaning step S100, the case holding jig 62 is cleaned. As shown in FIG. 18, the cleaning device 54 includes a first blower 55A which blows air as indicated by an arrow Z1 in FIG. 18 to the front wall 63D of the case main body 63, a second blower 55B which blows air as indicated by an arrow Z2 in FIG. 18 to the rear wall 63E of the case main body 63, and a rotary brush 56 which extends in a left-right direction and which cleans the periphery of the insertion hole 63H of the case main body 63. The rotary brush 56 cleans the fixing jig 64A, the first movable jig 64B, the second movable jig 64C (refer to FIG. 10), and the third movable jig 64D (refer to FIG. 10). The case holding jig 62 is configured so as to be movable such that the case holding jig 62 passes above the rotary brush 56. The cleaning device 54 is disposed on a downstream side of the extracting device 50. The case holding jig 62 after the cleaning is transported to the assembling device 60 (refer to FIG. 13A) and reused in the assembling device 60.

The lithium secondary battery 10 according to the present embodiment is preferable as a driving power supply of vehicles such as a hybrid vehicle and an electrical vehicle. A vehicle driving power supply may be configured as an assembled battery that combines a plurality of secondary batteries.

Although a detailed explanation of the present invention has been provided above, the embodiment and the examples described above are merely exemplary and the invention disclosed herein includes various alterations and modifications of the specific examples described above.

While the lithium secondary battery 10 is a square battery in the embodiment described above, a shape of the battery is not limited to a square and the battery may have a columnar shape or the like.

While after the first movable jig 64B is caused to approach the fixing jig 64A and the battery case 20 is sandwiched by the first movable jig 64B and the fixing jig 64A, the second movable jig 64C and the third movable jig 64D are caused to approach each other and the battery case 20 is sandwiched by the second movable jig 64C and the third movable jig 64D in the embodiment described above, this configuration is not restrictive. A configuration may be adopted in which after the second movable jig 64C and the third movable jig 64D are caused to approach each other and the battery case 20 is sandwiched by the second movable jig 64C and the third movable jig 64D, the first movable jig 64B is caused to approach the fixing jig 64A and the battery case 20 is sandwiched by the first movable jig 64B and the fixing jig 64A.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principle of the present invention. These preferred embodiments are provided with the understanding that they are not intended to limit the present invention to the preferred embodiments described in the specification and/or shown in the drawings. The present invention is not limited to the preferred embodiment described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or used during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A manufacturing method of a battery, comprising the steps of:
   preparing a battery case having an opening;
   fabricating an assembly by inserting a battery component and a lid which includes a terminal connected to the battery component and which closes the opening into the battery case;
   sandwiching the battery case by a pressing jig in a state where the opening faces downward to close a gap between the battery case and the lid;
   disposing the assembly so that the terminal faces upward by inverting the assembly in a state where the battery case is sandwiched by the pressing jig; and
   welding the lid and the battery case to each other in a state where the terminal faces upward and the battery case is sandwiched by the pressing jig.

2. The manufacturing method according to claim 1, wherein in the assembly fabricating step, the assembly is fabricated by inserting the battery component and the lid into the battery case from below the battery case in a state where the opening faces downward.

3. The manufacturing method according to claim 1, wherein
   the battery case and the pressing jig are made of metallic materials, and
   in the sandwiching step, the battery case is held at a prescribed position in a state where the opening faces downward by a holding jig made of a resin material and, subsequently, the battery case is sandwiched by the pressing jig.

4. The manufacturing method according to claim 1, wherein
   the lid is configured such that a cap having a first magnetic body is attachable thereto and an inlet for introducing a nonaqueous electrolyte into the battery case is formed therein,
   the pressing jig is provided with a second magnetic body which imparts a magnetic force to the first magnetic body, and
   the manufacturing method further comprises a step of attaching the cap to the inlet in a state where the terminal faces downward and the battery case is sandwiched by the pressing jig and holding the cap to a prescribed position by the magnetic force.

* * * * *